United States Patent Office 2,766,124
Patented Oct. 9, 1956

2,766,124

ANTIBIOTIC-CONTAINING ICE COMPOSITION

Sidney D. Upham, Pearl River, Francis M. Callahan, Stony Point, and Joseph F. Weidenheimer, Pearl River, N. Y., assignors to American Cyanamid Company, New York, N. Y., a corporation of Maine No Drawing. Application May 25, 1954,
Serial No. 432,302

16 Claims. (Cl. 99—150)

The present invention relates to antibiotic or bacteriostatic compositions especially adapted for the packing and preservation of foodstuffs and to the use of such antiseptic compositions for preventing bacterial spoilage and extending the storage life of fish, meat, vegetables, and the like. More specifically, the present invention relates to such compositions in frozen or iced forms particularly applicable to the preservation of highly perishable foodstuffs requiring storage under refrigeration.

Hitherto, various antiseptic compositions have been employed in efforts to preserve foodstuffs and to extend their storage life. For example, chlorine compounds have been used either by themselves or with other chemical substances to preserve food and to prevent bacterial or autolytic action. Such efforts have not found substantial commercial acceptance inasmuch as shrinkage of the foodstuff was promoted thereby, palatability was reduced or occasionally destroyed completely, and in some cases, discoloration and bleaching occurred.

Other processes of food preservation previously resorted to have involved the use of benzoates but such has met with some disfavor inasmuch as material alteration in the food flavor has resulted and chemical reactions or other changes have taken place which have detracted from the savor of the food.

Antibiotics, notably the tetracyclines which possess wide spectrum anti-bacterial effects, have been employed in the preservation of foodstuffs, particularly fish and meat, and have met with considerable success. For example, ice containing chlortetracycline has been used to retard the spoilage of flesh foods due to bacterial activity and it has been established that the storage life of such foods has been considerably extended by such methods.

It has been found, however, that such processes have not been completely successful and that in some instances the bacterial spoilage was not retarded sufficiently and the storage life was not increased materially over processes using ordinary ice.

It is therefore a principal object of the present invention to provide processes for sufficiently retarding bacterial spoilage in foodstuffs and materially increasing their storage life in substantially all applications thereof.

It has also been found that the cases wherein bacterial spoilage was not retarded and storage life not increased were considerably more common where ice having a larger size or shape has been used.

It is therefore another principal object of the present invention to provide processes of retarding bacterial spoilage in foodstuffs and increasing their storage life, regardless of the size or shape of the ice used.

It has been found that the antibiotics which are intended to be used in iced forms and are originally dissolved in aqueous solutions and then frozen, show a marked tendency to migrate away from the outer surfaces of the ice during the freezing thereof and to form portions of much higher concentrations of antibiotics in the center of the ice, thereby leaving the outer portions thereof in relatively low antibiotic concentrations. Such tendencies consequently remove the antibiotic from as great direct contact as desired with the foodstuffs and the beneficial bacteriostatic properties are diluted or lost to a considerable extent.

It has now been found that such undesirable migration of the antibiotic away from the outer portions of the ice may be inhibited by using aqueous solutions for the freezing process, which solutions have a pH of from about 6 to about 10 and contain (1) cations of a polyvalent metal and (2) polymeric, water- soluble, gelforming compounds which are capable of forming a double salt or ternary complex with the antibiotic. It has been further found that such migration is inhibited regardless of the methods employed for freezing or the rates at which such freezing takes place.

With regard to the pH range being from about 6 to about 10, it is to be stated that such are practical limits primarily dictated by the stability of the compounds (notably the antibiotics) under such conditions. Above or below such values may be used but are not preferably employed inasmuch as a reversal of the anti-migration effect is noted at such extremes.

The antibiotics which have particularly found application within the broad principles of the present invention are the tetracyclines including chlortetracycline, tetracycline, oxytetracycline and bromotetracycline, all of which possess wide anti-bacterial spectrum effects and are effective against both gram-positive and gram-negative bacteria. Mixtures of these antibiotics are also contemplated within the concepts of the present invention.

These antibiotics are non-toxic, particularly at such low concentrations, and do not adversely affect the color, taste or palatability of the foodstuffs. They are relatively stable under normal conditions of use as herein indicated but tend to disappear from the treated foodstuffs on standing so that, by the time they are to be consumed, no substantial amount remains. As a practical matter, the concentrations commercially used are so small that residual amounts, if present at all, offer no particular problem. This is all the more true when the foodstuff is to be heated and cooked during preparation for consumption.

It is, of course, apparent that these antibiotics may be used either per se, or in the form of their salts, either the acid salts, for example, the hydrochloride, the hydrobromide, or the nitrate, or the basic salts, such as the alkali metal salts including potassium and sodium, ethylene diamine, calcium, etc. The use of the antibiotic, per se, or in the form of one of its salts will, of course, depend upon the requirements of the particular situation.

The concentration of the antibiotic may be varied within wide limits and as low as from about 0.5 to about 1.0 part per million has been found to exert an observable effect in reducing the losses of flesh foods due to bacterial spoilage. For example, spoilage of whole, eviscerated fish was retarded markedly by ices containing as low as about 1 part per million of chlortetracycline (hydrochloride) by holding for 6 days at $-1°$ C. Codfish stored for 15 days in ice without any antibiotic developed as much as $187 \times 10^6$ bacteria per gram whereas other codfish samples stored for 15 days in ice containing 1 p. p. m. and 4 p. p. m. chlortetracycline developed only $20 \times 10^6$ and $15 \times 10^6$ bacteria per gram respectively. Salmon samples stored on a vessel for 6 days in ordinary sea water at $-1°$ C. and then stored for 6 and 9 days in ice, after landing, developed as much as $25 \times 10^6$ and $62 \times 10^6$ bacteria per gram, respectively. Other salmon samples stored on a vessel for 6 days at $-1°$ C. in sea water containing 2 p. p. m. chlortetracycline and then stored 6 and 9 days in chlortetracycline solutions, after landing, developed less than $0.1 \times 10^6$ and $0.12 \times 10^6$ bacteria per gram, respectively. Beef stored at 1.5° C. for 8 and 11 days without antibiotics developed as much as $1.6 \times 10^6$ and $310 \times 10^6$ bacteria per gram, respectively, whereas other beef samples stored at 1.5° C. for 8 and 11 days with 1 p. p. m. chlortetracycline developed less than $0.1 \times 10^6$ and $0.31 \times 10^6$ bacteria per gram, respectively.

It is to be appreciated that other foodstuffs, notably seafood, such as shrimp; poultry, such as chickens; and even the more perishable vegetables are similarly protected from bacterial spoilage to have their storage life extended.

The antibiotic ice compositions may be used in various ways as follows: ice cakes prepared in accordance with the general procedures of Examples 1, 2, 29 and 30 (to be described hereinafter) in large commercial, 300-pound cake-sizes containing 2 p. p. m. antibiotic were separately loaded aboard shrimp fishing vessels which left port within a short time thereafter. The shrimp, as they were caught, were immediately contacted with and refrigerated by means of the antibiotic ice. Upon conclusion of the trip and return of the vessels to port, the shrimp were stored for 6 days in the antibiotic ice used at sea, then removed, washed down, and examined for appearance and odor. In all cases the condition of the shrimp was excellent and conformed with the accepted standards of the industry. Shrimp, processed with ordinary ice under comparable conditions, were inferior in these respects.

The upper limits of the concentration of the antibiotic may also be varied within wide ranges depending upon the characteristics and properties of the foodstuffs involved, their nature and perishability, and upon the conditions and circumstances of storage. It has been generally found, however, that, although the normal commercial uses will require concentrations usually in the range of from about 0.5–1.0 to about 5.0 p. p. m., concentrations of up to 40–50 p. p. m. may be safely employed and in some cases, as high as 100 p. p. m. are utilizable.

The metallic cations present are preferably non-toxic and are polyvalent inasmuch as they require polyfunctional characteristics in order to act properly as bridging or linking members between the antibiotics and the colloidal gel-forming substances. Illustrative of the metals suitable for use in the present invention are those contained in group II of the periodic chart and particularly zinc, cadmium and mercury and the alkaline earth metals such as, for example, magnesium, calcium and strontium. The use of other polyvalent metals is not to be precluded, however, and others, notably the metals of groups VII and VIII having atomic weights between 54 and 59 such as iron, cobalt, nickel and manganese, have been found well adapted for the purposes involved.

It is to be pointed out that these metals are contained within the ice in contact with the foodstuffs and that they are present therein in extremely low concentrations. Consequently, any tendency of some of these metals towards toxicity is greatly diluted thereby as well as by the fact that any melted water from the ice may be readily rinsed and washed therefrom at a later time.

The concentration of the bivalent metallic cations may vary, depending to a large extent upon the amount of antibiotic present, and it has been found that ordinary tap water contains a sufficient concentration of the bivalent metallic ions to be applicable for the purposes of the present invention. Specifically, tap water derived from the Catskill (N. Y.) Reservoir containing approximately 50 p. p. m. calcium and 15 p. p. m. magnesium was found to be satisfactory. A second source of tap water from the Croton (N. Y.) Reservoir containing approximately 121 p. p. m. calcium and 42 p. p. m. magnesium was also found to be satisfactory.

In the event that distilled or demineralized water is to be used, a quantity of metallic cations may be separately added thereto, as desired or required, as metallic salts, such as chlorides, nitrates, acetates, sulfates, etc. In such a case, an addition as low as 15 p. p. m. of the metallic cations has been found sufficient.

The upper limits of the concentration of the metallic cation may also be varied within wide limits and water containing as high as 5 grams of the salts per 6 liters (200–600 p. p. m., based on the metallic cations) has been used. Naturally, the quantity of salt present should not be such as to exert any undesirable effect on the water or on its melting point.

The compound to which the antibiotic is linked by the metallic cation may be any polymeric, water-soluble, gel-forming compound which is sufficiently chemically reactive as to be capable of forming the double salt or ternary complex therewith. Specific examples of such polymeric compounds would include but not be limited to: colloidal cellulosic derivatives such as carboxymethyl cellulose, methyl cellulose, hydroxyethyl cellulose, carboxymethyl hydroxyethyl cellulose, and sodium cellulose sulfate; albuminous colloidal substances such as gelatin and animal glue; seaweed colloidal substances such as algin, alginic acid, sodium alginate, ammonium alginate, ammonium calcium alginate, and Irish moss; colloidal pectic substances such as pectins, pectic acid, pectinic acid, low ester (2.5–7% methoxyl) pectins; etc.

The limits on the amount of the polymeric, water-soluble, gel- and double salt-forming compound may be specifically defined. It has been found that, if the concentration of such a compound is less than about 75 mgms. per 6 liters ( or 12.5 p. p. m.) migration of the antibiotic to the center of ice is not sufficiently reduced.

With regard to the upper limit of the concentration of such a compound, it has been found that when more than about 2 grams per 6 liters (or 333 p. p. m.) are present, the freezing time is undesirably affected and the center portion of the ice is either unfrozen, composed of poor ice and is viscous and slimy or melting.

The invention will be further illustrated in greater detail by the following specific examples. It should be understood, however, that, although these examples may describe in particular detail some of the more specific features of the present invention, they are given primarily for purposes of illustration and the invention in its broader aspects is not to be construed as limited thereto.

*Example 1*

500 milligrams of carboxymethyl cellulose were dissolved in six liters of tap water which was previously known to contain calcium and 180 mg. of chlortetracycline in the form of the hydrochloride salt was added thereto in one portion. During the addition of the powders, agitation was maintained by use of mechanical stirrer. The pH of the solution was approximately 8. The solution was then poured into a 10-quart container and frozen until solid. No agitation was used during the freezing cycle.

At the end of the freezing period, the solid cake was taken from the container in one piece and fractured through the center. Visual inspection disclosed a slight opaque yellow color which was evenly dispersed throughout the cake. The fact that the chlortetracycline was evenly dispersed was confirmed by spectroscopic analysis of the center portion and the outer peripheral portions of the cake.

*Example 2*

400 milligrams of sodium carboxymethyl cellulose was dissolved in six liters of tap water which was previously known to contain calcium. 120 mg. of bromotetracycline in the form of the hydrochloride salt was added thereto in one portion. The pH of the solution was approximately 8. The solution was then poured into a 10-quart container and frozen until solid.

At the end of the freezing period, the solid cake was taken from the container in one piece and fractured through the center. Visual inspection disclosed a slight coloration which was evenly dispersed throughout the cake. The fact that the bromotetracycline was evenly dispersed was confirmed by spectroscopic analysis of the center portion and the outer peripheral portions of the cake.

*Example 3*

160 mg. of chlortetracycline in the form of its hydrochloride salt and 300 mg. of sodium cellulose sulfate were dissolved, with stirring, in 6 liters of tap water. The pH was determined to be about 8. The material was frozen in a metal container. Fracturing the ice along a diameter showed a transparent, light yellow color dispersed evenly throughout the ice. Substantially no migration had taken place.

*Example 4*

180 mg. of chlortetracycline HCl and 1.0 gram of Irish moss extractive (Seakem #9) were dissolved in 6 liters of tap water. The uniform liquid (pH=8) was frozen at sub-zero temperatures until a solid cake had formed. The frozen cake was split in two equal pieces disclosing a homogeneous, yellow transparent cake. Spectroscopic analysis confirmed the even distribution of the antibiotic throughout the ice. The ratio of the antibiotic in the geometric central portion to the outer circumferential portion was 1:1.

*Example 5*

350 milligrams of hydroxyethyl cellulose was dissolved in six liters of tap water which was previously known to contain calcium. 140 mg. of a mixture of chlortetracycline and tetracycline was added thereto. The pH of the solution was approximately 8. The solution was then poured into a 10-quart container and frozen until solid.

At the end of the freezing period, the solid cake was taken from the container in one piece and fractured through the center. Visual inspection disclosed a slight yellow color which was evenly dispersed throughout the cake. Even dispersion was confirmed by spectroscopic analysis of the center portion and the outer peripheral portions of the cake.

*Example 6*

400 mg. of carboxymethyl cellulose and 180 mg. of chlortetracycline hydrochloride were dissolved in 6 liters of distilled water substantially free of polyvalent metallic cations. The pH of the resulting liquid was determined to be 6.2. The liquid was frozen completely. After a few days, the cake was examined. Visual inspection showed heavy migration to the center of the cake. This was confirmed by spectroscopic analysis of the outer periphery and most inner portions. The distribution ratio of the chlortetracycline in the inner portions to the outer portion was 11:1.

*Example 7*

400 mg. of sodium carboxymethyl cellulose and 180 mg. of chlortetracycline were dissolved in 6 liters of distilled water. 100 mg. of $CaCl_2$ was dissolved in the above 6 liters by use of a mechanical stirrer. The liquid was frozen as above. Visual inspection disclosed a homogeneous cake. Analysis proved this to be so, with the distribution ratio of the inner portion being approximately 1:1.

*Example 8*

250 mg. of carboxymethyl cellulose and 180 mg. chlortetracycline:HCl were added to 6 liters of tap water. The pH of the water was adjusted to 3.5 by the use of glacial phosphoric acid. After complete freezing of the liquid, the solid cake was examined after fracturing along the diameter. Severe migration was observed.

*Example 9*

Example 8 was repeated using hydrochloric acid to adjust the pH to 3.5. The same result was observed. Severe migration of the chlortetracycline had occurred.

*Example 10*

Example 8 was repeated using citric acid to adjust the pH to 4.5. The result was identical. Severe migration had occurred.

*Example 11*

180 mg. of chlortetracycline and 1.0 gm. of gelatin of high bloom strength were dissolved in 6000 cubic centimeters of tap water. The pale yellow liquid (pH 7.5) was completely frozen and then examined. By splitting the cake along a diameter, easy visual inspection was possible. The yellow color was evenly dispersed throughout the cake. No migration had occurred.

*Example 12*

110 mg. of chlortetracycline hydrochloride and 250 mg. of carboxymethyl cellulose were dissolved in 6 liters of distilled water. To the solution was added 1.6 gm. of magnesium chloride. The solution was placed in a metal container and kept at a subfreezing temperature until completely solid. After the cake was fractured along a diameter, it was inspected visually and found to have a homogeneous, light yellow color throughout the cake except for a few minor places where striation marks due to pressure were observed. The uniformity of the antibiotic throughout the ice was confirmed by spectroscopic analysis.

*Example 13*

400 milligrams of animal glue was dissoved in six liters of tap water which was previously known to contain calcium. 90 mg. of chlortetracycline in the form of the hydrochloride salt was added thereto. The pH of the solution was approximately 8.5. The solution was then poured into a 10-quart container and frozen until solid.

At the end of the freezing period, the solid cake was taken from the container in one piece and fractured through the center. Visual inspection disclosed a slight, opaque yellow color which was evenly dispersed throughout the cake.

*Example 14*

Same as Example 12 except 1.5 g. of zinc chloride was substituted for the magnesium chloride. Migration of the antibiotic to the center of the ice was prevented.

*Examples 15, 16, 17 and 18*

Same as Example 12 except that 1.0 g. of cadmium chloride, 1.0 g. of ferrous ammonium sulfate, 1.0 g. of nickel sulfate hexahydrate and 1.0 g. of ferric ammonium sulfate, respectively, were used in place of the magnesium chloride. In all cases, the migration of antibiotic to the center of the ice cake was prevented.

*Example 19*

1 gram of pectinic acid (7% methoxyl), 180 mg. of tetracycline, and 500 mg. of $Ca(OH)_2$ were dissolved in 6 liters of tap water. (pH=9). The material was frozen until solid and then examined by cleaving the cake into two equal sectors. Inspection of the split surfaces disclosed the pale, yellow color of the antibiotic to be evenly dispersed throughout the cake except where slight striation marks due to pressure occurred.

*Example 20*

260 mg. of the tetracycline salt of methylene disalicyclic acid plus 500 mg. of methyl cellulose were dissolved in 6 liters of tap water. The pH of the solution was about 8. The solution was completely frozen to a solid cake in a metal container. Fracture of the cake along a diameter disclosed the antibiotic compound to be evenly dispersed throughout by its light yellow color. Analysis of the inner core and outer peripheries by use of spectrophotometer showed the distribution ratio to be approximately 1:1 throughout the cake for the antibiotic compound.

Example 21

Into 6 liters of tap water were dissolved 180 mg. of oxytetracycline (hydrochloride) and 500 mg. of low ester pectins. The material (pH=8) was frozen until completely solid. Then the cake was liberated from its metal container and the cake split along a diameter. Visual inspection of the cake showed a light, even color homogeneously spread throughout the cake except for some few slight striation marks caused by pressure due to expansion of the cake while freezing. Spectroscopic analysis confirmed the fact that the antibiotic was well dispersed throughout the cake.

Example 22

500 milligrams of algin were dissolved in six liters of tap water which was previously known to contain calcium. 180 mg. of chlortetracycline in the form of the hydrochloride salt was added thereto. The pH of the solution was approximately 8. The solution was then poured into a 10-quart container and frozen until solid.

At the end of the freezing period, the solid cake was taken from the container in one piece and fractured through the center. Visual inspection disclosed a slight opaque yellow color which was evenly dispersed throughout the cake.

Example 23

0.408 gram of chlortetracycline hydrochloride, 1.0 gram of calcium acetate and 5.65 grams of carboxymethyl cellulose were dissolved in 300 pounds of water previously treated to remove hardener, this experiment being conducted in a commercial ice house. The pH of the solution was about 6.4. The frozen solid cake, of long rectangular shape (approximately 1' x 2' x 4') was split in half, transversely to the longest side. The ice was assayed for its homogeneity, and it was found that the major portion of the chlortetracycline compound was evenly dispersed throughout the cake.

Example 24

0.408 gram of chlortetracycline hydrochloride, 1.0 gram of calcium acetate, and 22.6 grams of Irish moss (Seakem #9), were dissolved in 300 pounds of tap water. The pH of the solution was about 7.4. Result—as above in Example 23. Substantially no migration had occurred.

Example 25

Same as in Example 12 except that 0.5 gram of alginic acid was used in place of the carboxymethyl cellulose. No migration occurred.

Example 26

Same as in Example 12 except that 0.5 gram of sodium alginate was used in place of the carboxymethyl cellulose. No migration occurred.

Example 27

Same as Example 12 except 1.0 gram of $MnCl_2$ was substituted for 1.6 gram of magnesium chloride. Migration of the antibiotic to the center of the ice was prevented by the decreased amount of salt.

Example 28

500 milligrams of carboxymethyl hydroxyethyl cellulose were dissolved in six liters of tap water which was previously known to contain calcium. 180 mg. of chlortetracycline in the form of the hydrochloride salt was added thereto. The pH of the solution was approximately 8. The solution was then poured into a 10-quart container and frozen until solid.

At the end of the freezing period, the solid cake was taken from the container in one piece and fractured through the center. Visual inspection disclosed a slight opaque yellow color which was evenly dispersed throughout the cake.

Example 29

1.0 gram of manganese dichloride in the form of its tetrahydrate, $MnCl_2.4H_2O$, 180 mg. of tetracycline, and 1.0 gram of Irish moss (Seakem No. 9) were dissolved in six liters of distilled water. The solution was frozen in a metal container until completely solid. On removal of the cake from its container and splitting it in half along a top diameter, two light yellow, evenly colored pieces were revealed, although slight pressure striation marks could be seen. Spectrophotometric analysis on samples from the innermost and outermost sections confirmed the fact that the antibiotic was distributed in the approximate ratio of 1:1 throughout the entire cake.

Example 30

The above experiment was repeated using oxytetracycline. Visual inspection showed a cake having the exact color and appearance in Example 29.

Example 31

500 milligrams of carboxymethyl cellulose were dissolved in six liters of distilled water. 1 gram of strontium chloride and 180 mg. of chlortetracycline in the form of the hydrochloride salt was added thereto. The pH of the solution was approximately 8. The solution was then poured into a 10-quart container and frozen until solid.

At the end of the freezing period, the solid cake was taken from the container in one piece and fractured through the center. Visual inspection disclosed a yellow color which was evenly dispersed throughout the cake.

Examples 32, 33 and 34

Example 31 was repeated using 1 gram of Irish moss, 180 mgms. of chlortetracycline and (Example 32) 1 gram of ceric sulfate; (Example 33) 1 gram of mercuric chloride; and (Example 34) 1 gram of cobaltous chloride. Slight even colorations were noted in the resulting ice and no migration was observed.

Example 35

500 milligrams of ammonium calcium alginate was dissolved in six liters of tap water which was previously known to contain calcium. 180 mg. of chlortetracycline in the form of the hydrochloride salt was added thereto. The pH of the solution was approximately 8. The solution was then poured into a 10-quart container and frozen until solid.

At the end of the freezing period, the solid cake was taken from the container in one piece and fractured through the center. Visual inspection disclosed a slight opaque yellow color which was evenly dispersed throughout the cake.

Although we have described several specific examples of our inventive concept, we consider the same not to be limited thereby nor to the specific substances mentioned therein but to include various other compounds of equivalent constitution as set forth in the claims appended hereto. It is understood that any suitable changes, modifications and variations may be made without departing from the spirit and scope of the invention.

We claim:

1. An antibiotic composition for extending the storage life of foodstuffs comprising ice formed from an aqueous solution having a pH of from about 6 to about 10 and containing from about 0.5 to about 30 parts per million by weight of an antibiotic of the group consisting of tetracycline, chlortetracycline, bromotetracycline, oxytetracycline, and mixtures thereof; from about 15 to about 600 parts per million by weight of cations of a polyvalent metal from the group consisting of the metals of group II, the metals of group VII and VIII having an atomic weight between 54 and 59, and mixtures of such metals; and from about 12.5 to about 333 parts per million by weight of a polymeric, water-soluble compound capable of forming a double salt with said antibiotic and said metallic cations, said polymeric, water-soluble, gel-forming compound and said metallic cations serving to inhibit the migration of said antibiotic away from the outer surfaces of the ice during freezing thereof.

2. An antibiotic composition as defined in claim 1 wherein the antibiotic is tetracycline.

3. An antibiotic composition as defined in claim 1 wherein the antibiotic is chlortetracycline.

4. An antibiotic composition as defined in claim 1 wherein the antibiotic is oxytetracycline.

5. A composition as defined in claim 1 wherein the polyvalent metal is calcium.

6. A composition as defined in claim 1 wherein the polyvalent metal is magnesium.

7. A composition as defined in claim 1 wherein the polymeric, water-soluble, gel-forming compound is a water-soluble salt of carboxymethyl cellulose.

8. A composition as defined in claim 1 wherein the polymeric, water-soluble, gel-forming compound is sodium cellulose sulfate.

9. A composition as defined in claim 1 wherein the polymeric, water-soluble, gel-forming compound is gelatin.

10. A composition as defined in claim 1 wherein the polymeric, water-soluble, gel-forming compound is Irish moss.

11. In a method for extending the storage life of foodstuffs, the step of contacting said foodstuffs with ice having uniformly distributed therethrough an antibiotic, said ice being formed from an aqueous solution having a pH of from about 6 to about 10 and containing from about 0.5 to about 30 parts per million by weight of an antibiotic of the group consisting of tetracycline, chlortetracycline, bromotetracycline, oxytetracycline, and mixtures thereof; from about 15 to about 600 parts per million by weight of cations of a polyvalent metal of the group consisting of the metals of group II, the metals of group VII and VIII having an atomic weight between 54 and 59, and mixtures of such metals; and from about 12.5 to about 333 parts per million by weight of a polymeric, water-soluble, gel-forming compound capable of forming a double salt with said antibiotic and said metallic cations, said polymeric, water-soluble, gel-forming compound and said metallic cations serving to inhibit the migration of said antibiotic away from the outer surfaces of the ice during freezing thereof.

12. A method for extending the storage life of foodstuffs comprising the steps of forming an aqueous solution having a pH of from about 6 to about 10 and containing from about 0.5 to about 30 parts per million by weight of an antibiotic of the group consisting of tetracycline, chlortetracycline, bromotetracycline, oxytetracycline, and mixtures thereof; from about 15 to about 600 parts per million by weight of cations of a polyvalent metal from the group consisting of the metals of group II, the metals of group VII and VIII having an atomic weight between 54 and 59, and mixtures of such metals; and from about 12.5 to about 333 parts per million by weight of a polymeric, water-soluble compound capable of forming a double salt with said antibiotic and said metallic cations, said polymeric, water-soluble, gel-forming compound and said metallic cations serving to inhibit the migration of said antibiotic away from the outer surfaces of the ice during freezing thereof, freezing said aqueous solution to form ice and treating foodstuffs with said ice.

13. An antibiotic composition for extending the storage life of foodstuffs comprising a mixture of from about 0.5 to about 30 parts by weight of an antibiotic of the group consisting of tetracycline, chlortetracycline, bromotetracycline, oxytetracycline, and mixtures thereof; a salt of a polyvalent metal from the group consisting of the metals of group II, the metals of group VII and VIII having an atomic weight between 54 and 59, and mixtures of such metals in an amount capable of yielding from about 15 to about 600 parts by weight of cations from said metal salt; and from about 12.5 to about 333 parts by weight of a polymeric, water-soluble, gel-forming compound capable of forming a double salt with said antibiotic and the metallic cations from said metal salt, said mixture, upon dissolution in an aqueous media, being capable of being frozen therein and preventing the migration of said antibiotic to the center of the media during the freezing thereof.

14. A composition of matter useful for the preparation of ice in which an antibiotic is uniformly dispersed therethrough, the said composition comprising a mixture of from about 0.5–30 parts by weight of chlortetracycline, 15 to about 600 parts by weight of calcium ion in the form of a water soluble salt and from about 12.5–333 parts by weight of carboxy methylcellulose, said composition being water dispersible and being non-migratory when an aqueous solution thereof is frozen.

15. A composition of matter useful for the preparation of ice in which an antibiotic is uniformly dispersed therethrough, the said composition comprising a mixture of from about 0.5–30 parts by weight of chlortetracycline, 15 to about 600 parts by weight of calcium ion in the form of a water soluble salt and from about 12.5–333 parts by weight of Irish moss, said composition being water dispersible and being non-migratory when an aqueous solution thereof is frozen.

16. A composition of matter useful for the preparation of ice in which an antibiotic is uniformly dispersed therethrough, the said composition comprising a mixture of from about 0.5–30 parts by weight of tetracycline, 15 to about 600 parts by weight of calcium ion in the form of a water soluble salt and from about 12.5–333 parts by weight of Irish moss, said composition being water dispersible and being non-migratory when an aqueous solution thereof is frozen.

References Cited in the file of this patent

UNITED STATES PATENTS 2,203,230    Nitsche _____ June 4, 1940

FOREIGN PATENTS 503,866    Canada _____ June 22, 1954

OTHER REFERENCES

"Microbiology of Meats," text by L. B. Jensen, 2nd Edition, published 1945, by The Garrard Press, Champaign, Illinois, page 376.

Abstract, "Progress Reports" 83, 35, 1950, Fisheries Research Board, Canada, of H. L. A. Tarr, B. A. Southcott, and H. M. Bissett. Copy of abstract in Bureau of Agricultural and Ind. Chemistry, Agricultural Res. Administration U. S. Dept. of Agriculture, "Annotated Bibliography of Subtilin" October 1947. Revised March 1947; February 1950; October 1950; August 1952. No. AIC-168, page 17.